US010936971B2

(12) United States Patent
Suzuki et al.

(10) Patent No.: US 10,936,971 B2
(45) Date of Patent: Mar. 2, 2021

(54) OPTIMIZATION APPARATUS AND OPTIMIZATION METHOD FOR HYPER PARAMETER

(71) Applicant: Hitachi, Ltd., Tokyo (JP)

(72) Inventors: Mayumi Suzuki, Tokyo (JP); Takuma Shibahara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 77 days.

(21) Appl. No.: 16/248,822

(22) Filed: Jan. 16, 2019

(65) Prior Publication Data
US 2019/0228335 A1 Jul. 25, 2019

(30) Foreign Application Priority Data
Jan. 22, 2018 (JP) .............................. JP2018-007955

(51) Int. Cl.
*G06N 20/00* (2019.01)
*G06F 16/33* (2019.01)
*G06F 40/30* (2020.01)
*G06F 16/93* (2019.01)

(52) U.S. Cl.
CPC ......... *G06N 20/00* (2019.01); *G06F 16/3344* (2019.01); *G06F 40/30* (2020.01); *G06F 16/93* (2019.01)

(58) Field of Classification Search
CPC ................................ G06N 20/00; G06F 40/30
See application file for complete search history.

(56) References Cited

U.S. PATENT DOCUMENTS

| 10,534,994 B1* | 1/2020 | Kaul ...................... G06N 3/084 |
| 2011/0087668 A1* | 4/2011 | Thomas ................ G06F 16/355 707/738 |
| 2014/0358831 A1* | 12/2014 | Adams .................. G06N 20/00 706/12 |
| 2015/0248478 A1* | 9/2015 | Skupin .................. G06F 16/367 707/609 |

(Continued)

FOREIGN PATENT DOCUMENTS

JP        2012-53848 A        3/2012

OTHER PUBLICATIONS

Wang, Lidan, et al. "Efficient hyper-parameter optimization for NLP applications." Proceedings of the 2015 Conference on Empirical Methods in Natural Language Processing. 2015. (Year: 2015).*

(Continued)

*Primary Examiner* — Shaun Roberts
(74) *Attorney, Agent, or Firm* — Mattingly & Malur, PC

(57) ABSTRACT

To provide an optimum hyper parameter for determining a learning model using a natural language as a target. An optimization apparatus including: a processor and a memory and performing learning of a document set by natural language processing has an optimization section configured to determine a hyper parameter satisfying a predetermined condition on the basis of previously set group data, generate a learning model by the determined hyper parameter, and acquire a high-dimensional vector from the learning model; and a high-dimensional visualization section configured to convert the high-dimensional vector of a word or document as an analysis target on the basis of the group data.

8 Claims, 12 Drawing Sheets

(56) References Cited

U.S. PATENT DOCUMENTS

2017/0293687 A1* 10/2017 Kolotienko ............ G06F 40/30

OTHER PUBLICATIONS

Tomas Mikolov, et al. "Efficient Estimation of Word Representations in Vector Space", Sep. 7, 2013, ICLR 2013.
Japanese Office Action received in corresponding Japanese Application No. 2018-007955 dated Dec. 22, 2020.
Saito, K, "Deep Learning Produced from Nothing", Feb. 13, 2017, pp. 197-203.

* cited by examiner

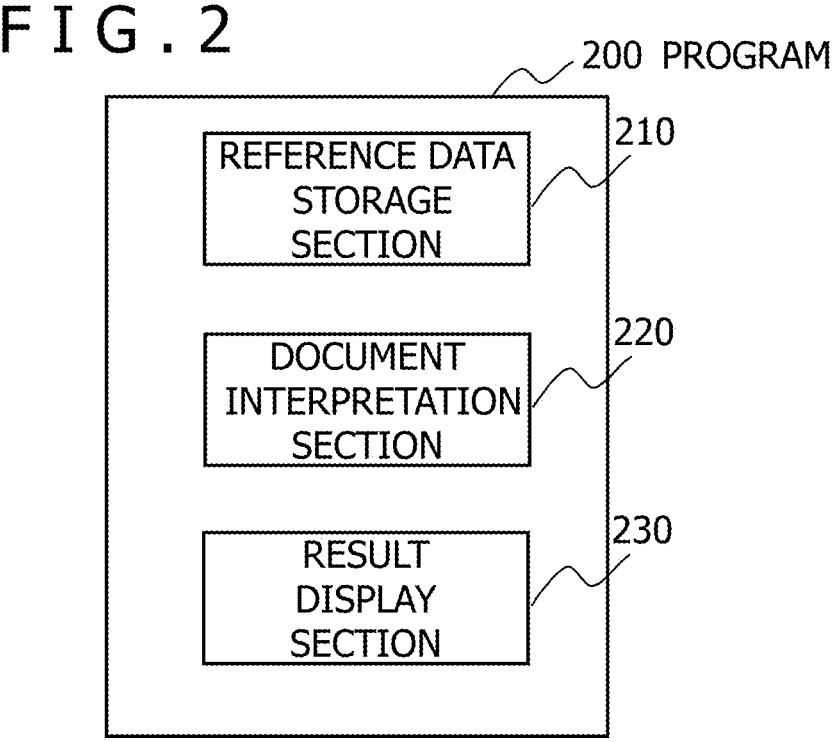
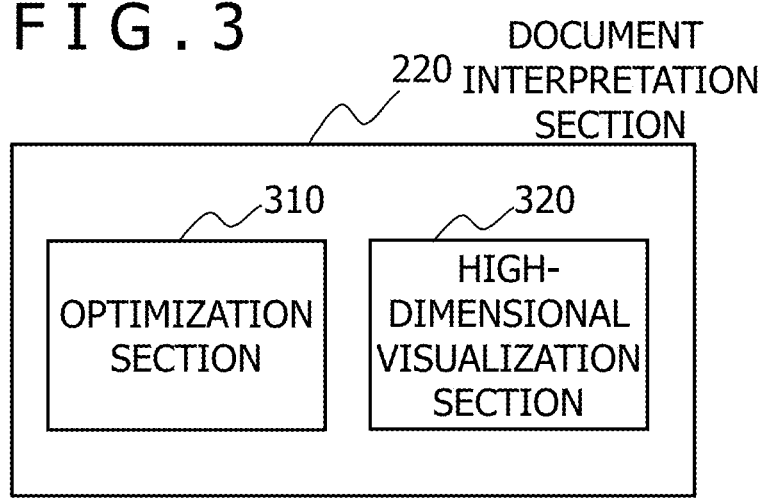

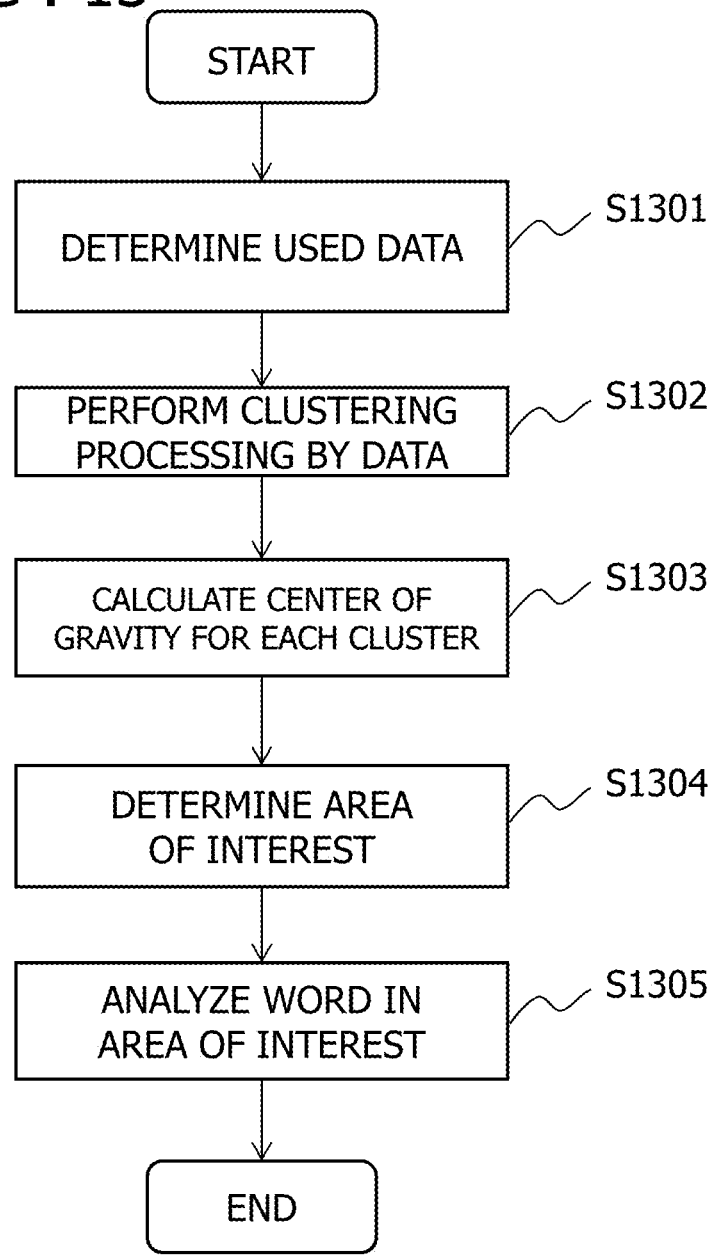

OPTIMIZATION APPARATUS AND OPTIMIZATION METHOD FOR HYPER PARAMETER

CLAIM OF PRIORITY

The present application claims priority from Japanese patent application JP 2018-007955 filed on Jan. 22, 2018, the content of which is hereby incorporated by reference into this application.

FIELD OF THE INVENTION

The present invention relates to a technology for optimizing a learning result using a natural language.

BACKGROUND OF THE INVENTION

A machine learning technique is noticed as a technique for creating a new social value for an analysis of data accumulated in various fields such as health care, finance, or industry.

In a learning in natural language processing, conversion to a numerical value of a high-dimensional vector or the like is performed in each word or sentence included in a document set. A relationship between words or sentences is converted into a numerical value to thereby process a natural language even in a computer.

In the learning in the natural language processing, a plurality of hyper parameters exist. In the hyper parameter of the learning in the natural language processing, a kind of algorithm such as Bag of Words or Word to Vec and a parameter necessary for determining a model in each algorithm are specified.

When the hyper parameter is changed, a different model is generated. A document set as a learning target is changed and also thereby a different model is generated. A verification in which a combination of which hyper parameters is optimum is performed as below.

Descriptions will be made by using a case where a word is learnt. First, a plurality of word pairs are previously prepared. A pair of words having a relationship is made, for example, a word pair of comparatives such as great and greater or tough and tougher, an opposite sense such as a brother and sister, or a name of nation and a name of city such as Japan and Tokyo. It is searched that a result in which a word vector of great and a word vector of greater are subtracted from the generated model and a word vector of tougher is added to a result of the subtraction is closest to which word in all of the learnt words. When the closest word is tough, it is set to a correct answer.

This calculation is repeated to each word pair and an accuracy of the model is calculated. When a word is frequently used, a word pair is prepared in large quantities and a combination of hyper parameters that are most accurate is searched. The process permits a model in which a relationship between words is correctly learnt to be obtained (e.g., Tomas Mikolov, Kai Chen, Greg Corrado, Jeffrey Dean, "Efficient Estimation of Word Representations in Vector Space", 2013, 09, 07, ICLR 2013).

SUMMARY OF INVENTION

In a word having high technicality used in a business field such as health care, finance, or industry, it is not easy to prepare a word pair or a sentence pair. That is, an accuracy verification method for a more high-accuracy model may be required in a case where a document set having high technicality is intended.

The present invention has an object to provide a hyper parameter that is capable of generating a plurality of groups obtained by collecting a word or sentence including a similar meaning or similar expression and generating a model such that a distance between the high-dimensional vectors within the group becomes smallest, in hyper parameter searching for determining a model in a learning using a natural language as a target.

In order to achieve the foregoing object, the present invention provides an optimization apparatus having a processor and a memory and performing learning of a document set by natural language processing, the optimization apparatus including: an optimization section configured to determine a hyper parameter satisfying a predetermined condition on the basis of previously set group data, generate a learning model by the determined hyper parameter, and acquire a high-dimensional vector from the learning model; and a high-dimensional visualization section configured to convert the high-dimensional vector of a word or document as an analysis target on the basis of the group data.

According to the present invention, it is possible to select a hyper parameter capable of generating a high-accuracy high-dimensional vector even in a term having high technicality for the document set. Therefore, it is possible to obtain an optimum model in a standard according to the technicality of the document set for learning. It can be expected that the high-dimensional vector of each word generated by the optimum model is converted into an optimum low-dimensional space and information that is helpful to an interpretation is presented for each word.

BRIEF DESCRIPTION OF THE DRAWINGS

FIG. 2 is a block diagram illustrating an example of software operating by the optimization apparatus according to the embodiment of the present invention;

FIG. 3 is a block diagram illustrating an example of a document interpretation section according to the embodiment of the present invention;

FIG. 13 is a flowchart illustrating an example of processing performed by a speculation element presentation section according to the embodiment of the present invention.

DESCRIPTION OF THE PREFERRED EMBODIMENT

Figure 1:
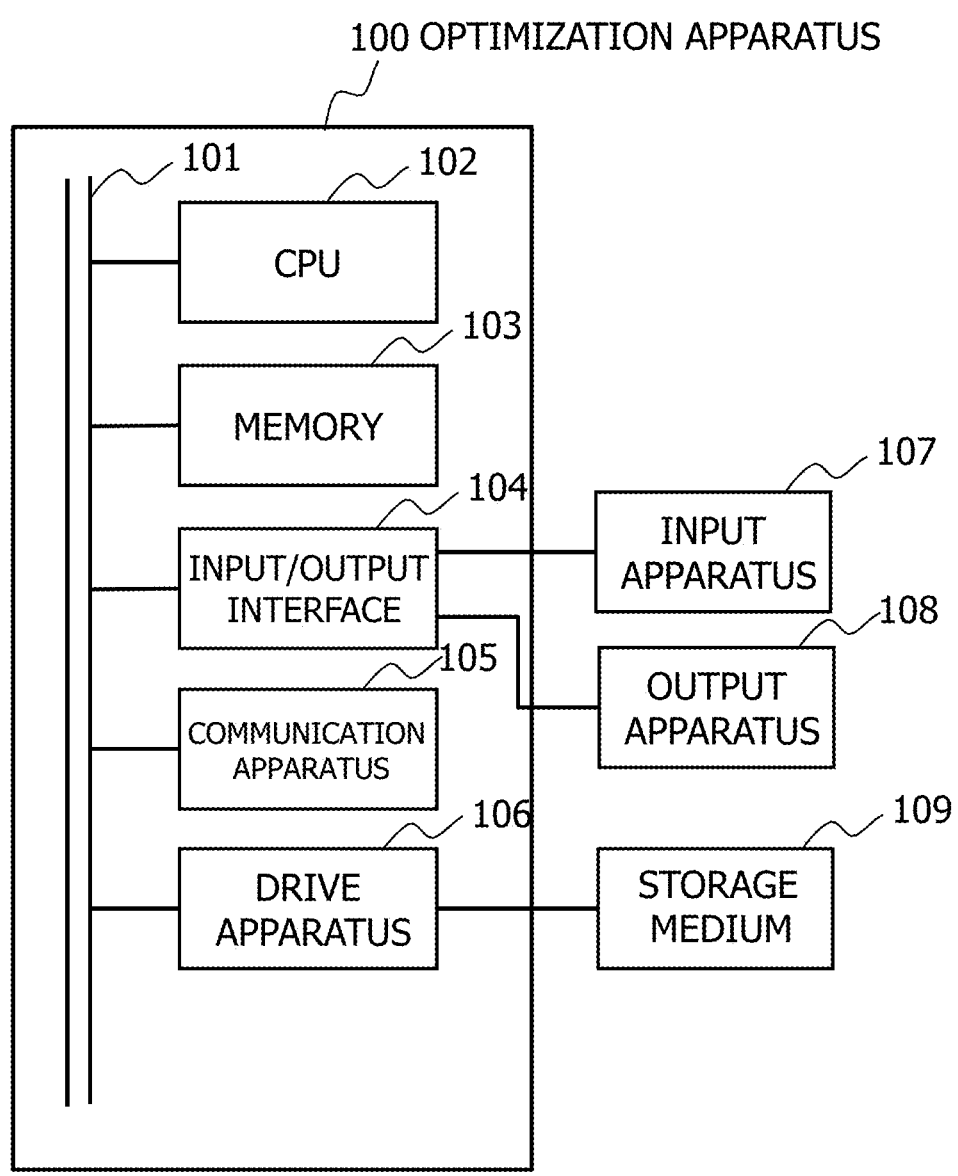
FIG. 1 is a block diagram illustrating an example of a configuration of an optimization apparatus according to an embodiment of the present embodiment.

An embodiment of the present invention will now be described with reference to the accompanying drawings. Hereinafter, in all figures for describing the embodiment of the present invention, the same reference characters basically denote the same parts or parts having the same function and the description will not be repeated.

First, an optimization apparatus according to the present embodiment will be described. The optimization apparatus according to the present embodiment generates a learning model of a natural language by selecting an optimum hyper parameter and performs a display of visualization results by an optimum visualization parameter. Hereinafter, in a description of learning in a natural language processing, a description will be made in a case where words are set to a learning target. Note that an optimum hyper parameter (first hyper parameter) is a parameter satisfying predetermined conditions as described below.

FIG. 1 is a block diagram illustrating an example of a hardware configuration of the optimization apparatus 100 according to the present embodiment. The optimization apparatus 100 according to the present embodiment includes a CPU 102, a memory 103, an input/output interface 104, a communication apparatus 105, and a drive apparatus 106, which are connected to each other through a data bus 101.

The CPU 102 is composed of a control apparatus and an operational apparatus, and is a central processing unit that handles control, an operation or an information transfer of the optimization apparatus 100. The memory 103 is a storage apparatus that is capable of retaining digital data to be processed by the optimization apparatus 100 for a fixed period.

The input/output interface 104 is an interface that is used for an input and output of information from and to equipment connected to an external portion of the apparatus. It is possible to connect the input apparatus 107 such as a keyboard or a mouse and an output apparatus 108 such as a display to the input/output interface 104.

The communication apparatus 105 is an apparatus in which a cable connecting to a network such as the Internet is connected to the communication apparatus 105, and thereby the apparatus is capable of connecting to the network such as the Internet. The drive apparatus 106 is an apparatus that includes a storage medium 109 such as a spare disk medium or HDD in which information has been written or capable of being written and reads out the written information or performs writing of information.

In the memory 103, there are stored a program 200 and various pieces of data necessary for implementing functions of the optimization apparatus 100 according to the present embodiment. The CPU 102 executes the program 200 stored in the memory 103 to thereby perform various processings for implementing the functions of the optimization apparatus 100. Note that the program 200 executed by the CPU 102 may be stored in the storage medium 109 connected to the drive apparatus 106. Further, the program 200 may be read in and stored in the memory 103.

FIG. 2 is a block diagram illustrating an example of functions implemented by executing the program 200 for operation processing stored in the memory 103 or the storage medium 109. The program 200 includes a reference data storage section 210, a document interpretation section 220, and a result display section 230. Note that the document interpretation section 220 may be a document interpretation module.

The reference data storage section 210 has a function of storing a plurality of groups (group data) obtained by collecting words or sentences including a similar meaning or similar expression (or function). Note that the reference data storage section 210 may include both a group of words or sentences for learning and a group of words or sentences for evaluation.

The document interpretation section 220 includes a function of generating an optimum model (learning model) by using words or sentences of the group prepared by the reference data storage section 210 and converting the model format into a format a person can easily interpret through visibility. Note that the document interpretation section 220 performs the conversion by using the words or sentences of the group stored in the reference data storage section 210. Further, the document interpretation section 220 may generate the optimum model by using data read from the storage medium 109.

The result display section 230 includes a function of displaying an operation through a user interface or a result and halfway result of the document interpretation section 220 on the output apparatus 108.

Each function section of the document interpretation section 220 and the result display section 230 is loaded in the memory 103 as the program 200. Note that, in the present embodiment, an example of implementing a natural language learning section 430 (described below) by using software is illustrated, and further the natural language learning section 430 may be implemented by using hardware. The CPU 102 performs processing in accordance with a program of each function section, and thereby operates as the function section that provides a predetermined function. For example, the CPU 102 performs processing in accordance with a document interpretation program and thereby functions as the document interpretation section 220. The CPU 102 performs processing in accordance with the other programs and thereby functions as the document interpretation section 220 in the same manner. Further, the CPU 102 operates even as the function sections that provide respective functions of a plurality of processings executed by each program. A computer and a computer system are an apparatus and system including the above function sections.

Information for implementing the respective functions of the optimization apparatus 100 such as programs and tables can be stored in the drive apparatus 106, a memory device such as a non-volatile semiconductor memory, hard disk drive, or SSD (solid state drive), or a computer readable non-temporary data storage medium such as an IC card, SD card, or DVD.

FIG. 3 is a block diagram illustrating an example of functions implemented by executing the document interpretation section 220. The document interpretation section 220 includes an optimization section 310 and a high-dimensional visualization section 320. The optimization section 310 includes a function of generating the optimum model by using words or sentences of the group prepared by the reference data storage section 210.

As described below, the high-dimensional visualization section 320 includes a function of converting a high-dimensional vector obtained by a dispersal expression (or embedded expression) by applying a word to a model into a low-dimensional vector, to thereby converting the model format into a format a person can easily interpret through visualization.

Figure 4:
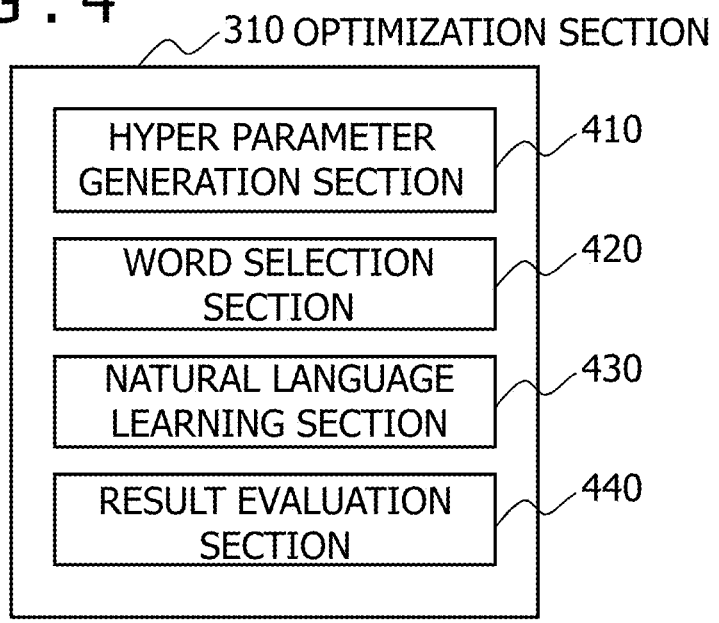
FIG. 4 is a block diagram illustrating an example of an optimization section according to the embodiment of the present invention.

FIG. 4 is a block diagram illustrating an example of functions implemented by executing the optimization section 310. The optimization section 310 includes a hyper parameter generation section 410, a word selection section 420, the natural language learning section 430, and a result evaluation section 440.

The hyper parameter generation section 410 includes a function of generating a hyper parameter to be searched in order to generate the optimum model by using words or sentences of the group prepared by the reference data storage section 210. The word selection section 420 includes a function of reading words or sentences used for the evaluation of a model from the reference data storage section 210 and managing the words or sentences in each group.

The natural language learning section 430 includes a function of generating a model by machine learning by using the hyper parameter generated by the hyper parameter generation section 410. The result evaluation section 440 includes a function of causing the model generated by the natural language learning section 430 to output the high-dimensional vector using the dispersal expression by applying the words read by the word selection section 420, obtaining the high-dimensional vector, and then performing the evaluation of an accuracy of the model by using the group managed by the reference data storage section 210.

Figure 5:
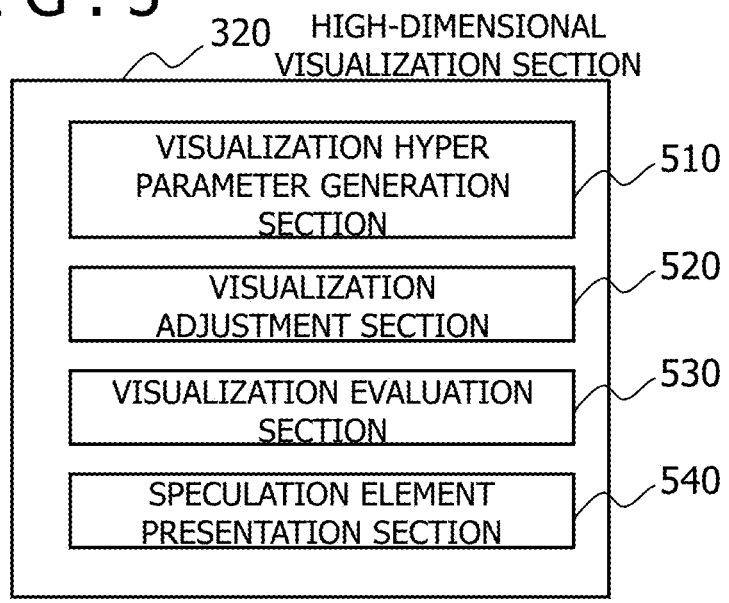
FIG. 5 is a block diagram illustrating an example of a high-dimensional visualization section according to the embodiment of the present invention.

FIG. 5 is a block diagram illustrating an example of functions implemented by executing the high-dimensional visualization section 320. The high-dimensional visualization section 320 includes a visualization hyper parameter generation section 510, a visualization adjustment section 520, a visualization evaluation section 530, and a speculation element presentation section 540.

In order that the high-dimensional vector (e.g., 200-dimensional vector) acquired from the model by the result evaluation section 440 may be converted into the low-dimensional vector a person can interpret by visual inspection such as a two-dimensional vector or three-dimensional vector, the visualization hyper parameter generation section 510 includes a function of generating a visualization hyper parameter.

The visualization adjustment section 520 includes a function of using the visualization hyper parameter (second hyper parameter) generated by the visualization hyper parameter generation section 510 and converting the high-dimensional vector acquired from the model into the two-dimensional vector or three-dimensional vector. The visualization evaluation section 530 includes a function of performing an accuracy evaluation to the low-dimensional vector that is converted into the two-dimensional vector or three-dimensional vector by the visualization adjustment section 520 by using words or sentences of the group stored in the reference data storage section 210.

The speculation element presentation section 540 includes a function of presenting an element for performing a speculation about the visualization results or high-dimensional vector by using the visualization results having a highest accuracy by the visualization evaluation section 530, a dictionary constructed by technical knowledge or a document set used for learning, the high-dimensional vector having the highest accuracy in the result evaluation section 440, or the like.

Figure 6:
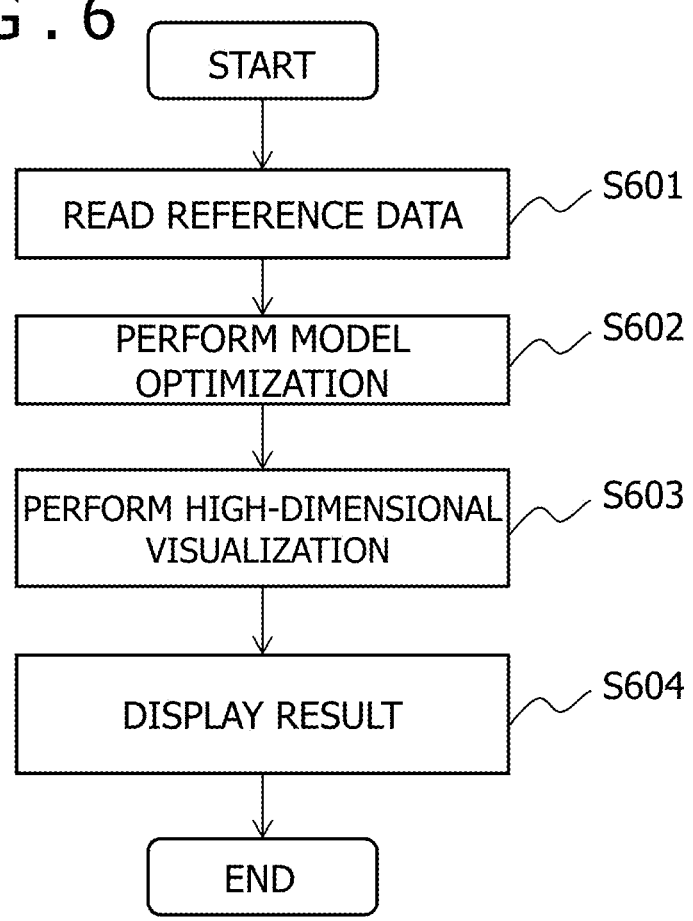
FIG. 6 is a flowchart illustrating an example of the processes performed by the optimization apparatus according to the embodiment of the present invention.

Next, a stream of the processes at the time of executing the program 200 according to the present embodiment will be described. FIG. 6 is a flowchart illustrating an example of the processes performed by the optimization apparatus 100 according to the present embodiment. The optimization apparatus 100 presents an optimum model satisfying set conditions, a result of visualizing the high-dimensional vector or the like expressed by using the optimum model, and an element for speculation about the result, in a learning of the natural language processing by the execution of the program 200. Here, the element for performing the speculation about output results of the high-dimensional vector includes a list based on a distance between words, a list of sentences or documents in which words appear, a meaning of the words, and the like.

The optimization apparatus 100 allows the document interpretation section 220 to function and reads a reference data to the memory 103 from the storage medium 109 connected to the drive apparatus 106 (step S601). Note that the optimization apparatus 100 may accept a specification of the reference data from the input apparatus 107 etc. and read the reference data to the memory 103 from the storage medium 109. Further, words, sentences, or documents are included in the reference data. In addition, the document interpretation section 220 may read the reference data from the reference data storage section 210.

Continuously, the optimization section 310 of the optimization apparatus 100 tries plural kinds of hyper parameters including the document set for learning or a selection of learning method and determines the optimum model (step S602). Note that, from among the hyper parameters to be tried, an initial hyper parameter may be given in advance.

Then, the high-dimensional visualization section 320 of the optimization apparatus 100 determines the optimum visualization hyper parameter for converting the high-dimensional vector generated by the optimum model determined in step S602 into the low-dimensional vector. Further, the high-dimensional visualization section 320 generates an element (speculation element) for performing the speculation about an output result of the high-dimensional vector (step S603).

Finally, the high-dimensional visualization section 320 displays the optimum model that is a result of step S602 and the hyper parameter thereof, a conversion result to an optimum low-dimensional space that is a result of step S603, the visualization hyper parameter at the time of generating the conversion result, and an element for performing the speculation about the output result of the high-dimensional vector, on the output apparatus 108 and completes the process (step S604). Note that only the optimization section 310 may be allowed to function and the high-dimensional visualization section 320 may not be allowed to function.

Through the process, the optimization apparatus 100 can output the visualization hyper parameter and a conversion result of the high-dimensional vector to the output apparatus 108, and can present to the users of the optimization apparatus 100 a hyper parameter capable of generating a model in which a distance between the high-dimensional vectors within the group becomes smallest.

Figure 7:
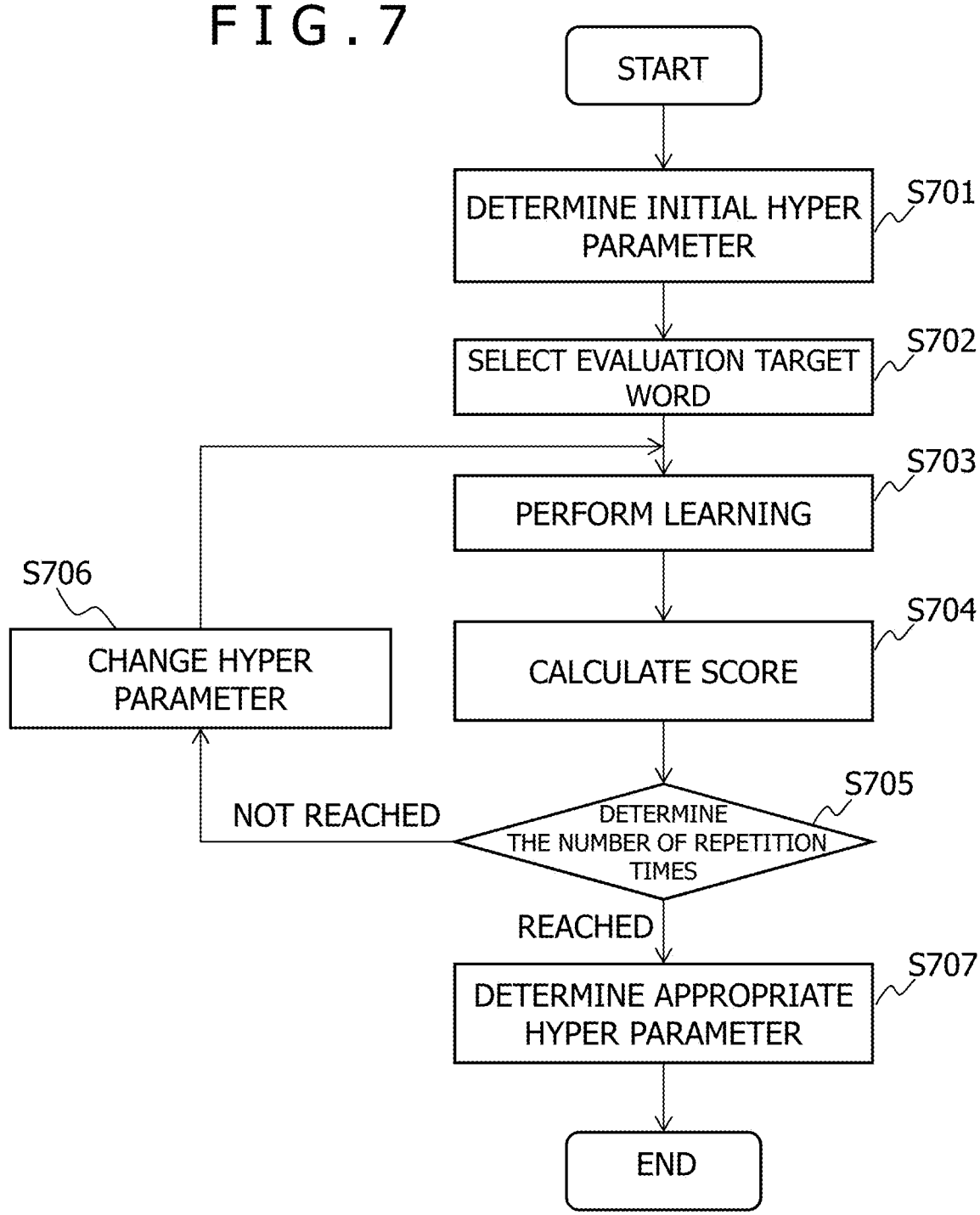
FIG. 7 is a flowchart illustrating an example of the processes performed by the optimization section according to the embodiment of the present invention.

FIG. 7 is a flowchart illustrating an example of the processes performed by the optimization section 310 of the optimization apparatus 100. The processes are performed in step S602 illustrated in FIG. 6. The optimization section 310 of the optimization apparatus 100 tries plural kinds of hyper parameters including the document space for learning and a selection of a learning method and determines the optimum model.

First, the optimization section 310 determines a range of the hyper parameter and the initial hyper parameter (step S701). The hyper parameter for learning in the natural language processing is information about the document set for learning, a kind of algorithm such as Bag of Words or Word to Vec, a length of a dimension necessary for determining a model in each algorithm, how many words in the vicinity of words as a target is used for learning, and the like.

Next, the optimization section 310 selects words or sentences to be evaluated by using the reference data stored in the reference data storage section 210 (step S702). A plurality of groups obtained by collecting words or sentences including a similar meaning or similar expression are stored in advance in the reference data.

For example, in a case where a business field of health care, particularly, a natural language regarding diabetes mellitus is desired to be learnt, type 1 diabetes, HbA1c (hemoglobin A1c), and spleen Langerhans' islet β cell are set to group 1 and type 2 diabetes, HbA1c, increasing age, and KCNJ15 are set to group 2.

Through the process, a word deeply related to a diagnosis of the type 1 diabetes is registered in group 1 and a word deeply related to a diagnosis of the type 2 diabetes is registered in group 2. Further, the above word is selected by the word selection section 420, and then the above word may be stored in the reference data storage section 210 while forming a group.

Continuously, the optimization section 310 performs learning in the natural language processing by using the hyper parameter determined in step S701 (step S703). Further, the optimization section 310 generates a model as a learning result.

Then, the optimization section 310 calculates a score by using the model generated in step S703 and the words or sentences (reference data) selected in step S702 (step S704). In the score, a vector distance between the words registered in each group of the reference data is calculated as a cosine distance and is turned to the total sum of all the groups. The score calculation formula is represented by the following formula (1).

[Mathematical Formula 1]

$$\sum_{g=0}^{M} \sum_{i=0}^{N} \cos(\text{model}(wordX_{g,i}), \text{model}(wordY_{g,i})) \quad (1)$$

Here, M means a maximum number of a group number and N means a maximum number of a word pair number in each group. Further, a word $X_{g,i}$ and a word $Y_{g,i}$ mean two words of the i-th word pair of a group number g.

In a case where the score is small, meanings of the words registered in group 1 are close to each other and also meanings of the words registered in group 2 are close to each other. Therefore, it can be estimated that the words registered in group 1 are learnt as the words deeply related to the type 1 diabetes and the words registered in group 2 are learnt as the words deeply related to the type 2 diabetes. In the present embodiment, the score is set to the cosine distance between the words; however, it is not limited thereto. Further, a different index such as the cosine distance of a vector difference between the words may be used.

Continuously, the optimization section 310 determines the number of repetition times (step S705). Here, it is determined whether or not the number of repetition times reaches the predetermined number of times of performing the optimization (predetermined value). The number of times of performing the optimization may be determined in advance. Alternatively, the number of times of performing the optimization may be given as the dynamic number of times in which it is determined whether or not the score calculated in step S704 is smaller than a predetermined threshold.

If the number of repetitions times does not satisfy conditions such as the number of times of performing the optimization etc., the optimization section 310 changes the hyper parameter set in step S701 and repeats the processes from step S703 to step S705 again (step S706).

Here, in the hyper parameter, in a case where the number of times of performing the optimization is determined in advance, the number of patterns (the number of times) may be prepared in advance. Alternatively, searching may be performed like a descent method etc. so that the score becomes smallest.

If the conditions of the number of times of performing the optimization etc. are satisfied, the optimization section 310 selects a hyper parameter in which the score is smallest as the optimum hyper parameter from among the processes from step S703 to step S706. Further, the optimization section 310 performs learning by using the hyper parameter and generates the model (step S707).

Here, in the model generated by the optimization section 310, a model generated in each trial of the optimization by changing the hyper parameter may be retained. Then, the model in which the score is smallest may be extracted in step S707.

Through the process, the model generated through the trial of the hyper parameter is evaluated and the optimum model in which the score is smallest is determined.

Figure 8:
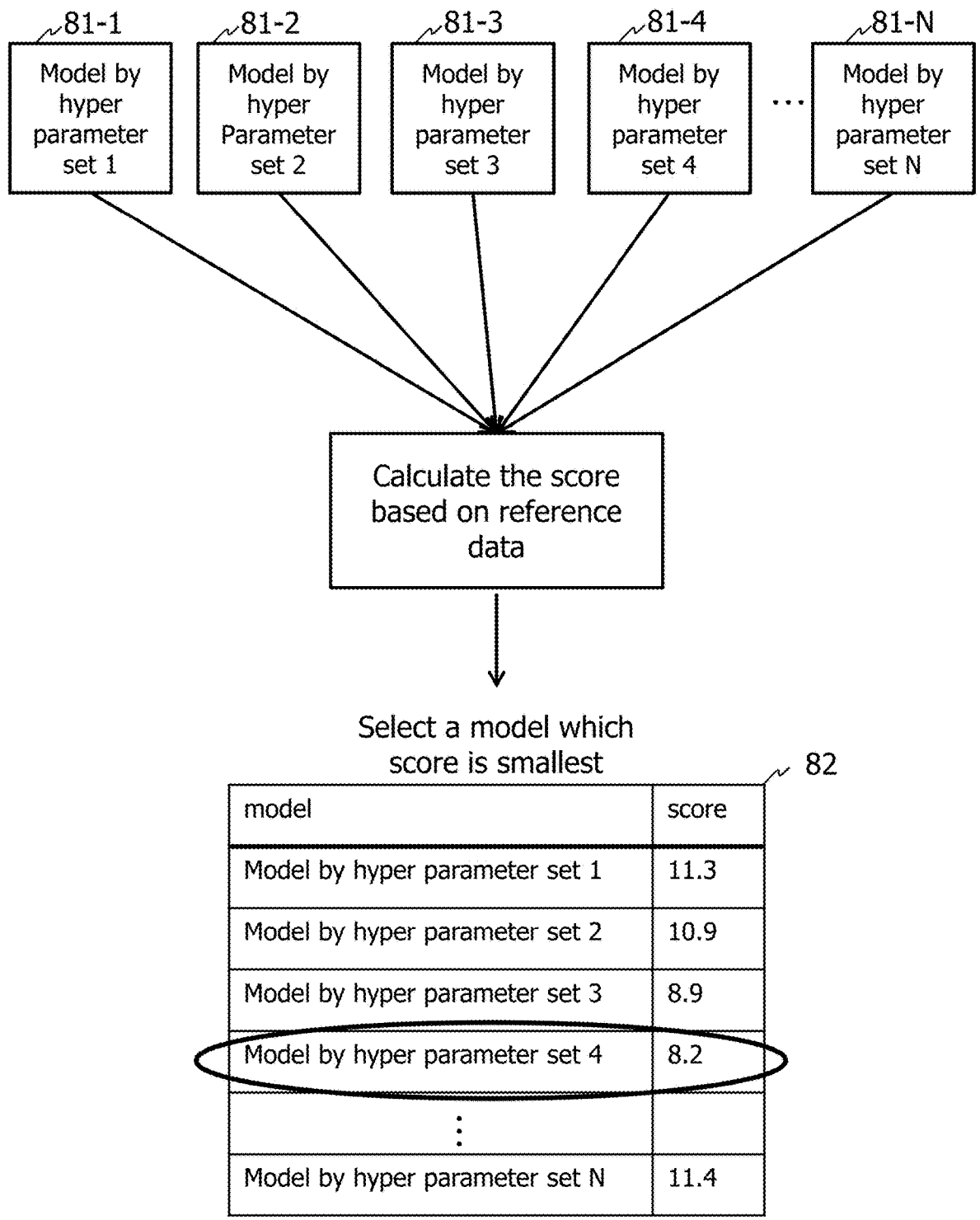
FIG. 8 is a diagram illustrating an example of a method for determining the number of repetition times of performing optimization according to the embodiment of the present invention.

FIG. 8 is a diagram illustrating an example of a method for determining the number of repetition times of performing the optimization in step S705. The user or the like of the optimization apparatus 100 determines the number of times of performing the optimization in advance and prepares a combination of the hyper parameters for the number of times.

In the present embodiment, the number of times of performing the optimization is set to N. Then, the optimization section 310 uses N kinds of models (81-1 to 81-N) generated by N kinds of hyper parameters and calculates the score of each model in step S704. Alternatively, the optimization section 310 may perform N times processing in which the searching is performed by using the descent method etc. for the hyper parameter in each trial and the hyper parameter is changed at random.

The score calculated by the optimization section 310 can be indicated in each model like a table 82 illustrated in FIG. 8. In the example illustrated in the figure, a model of the hyper parameter pattern 4 having the smallest score is selected.

Figure 9:
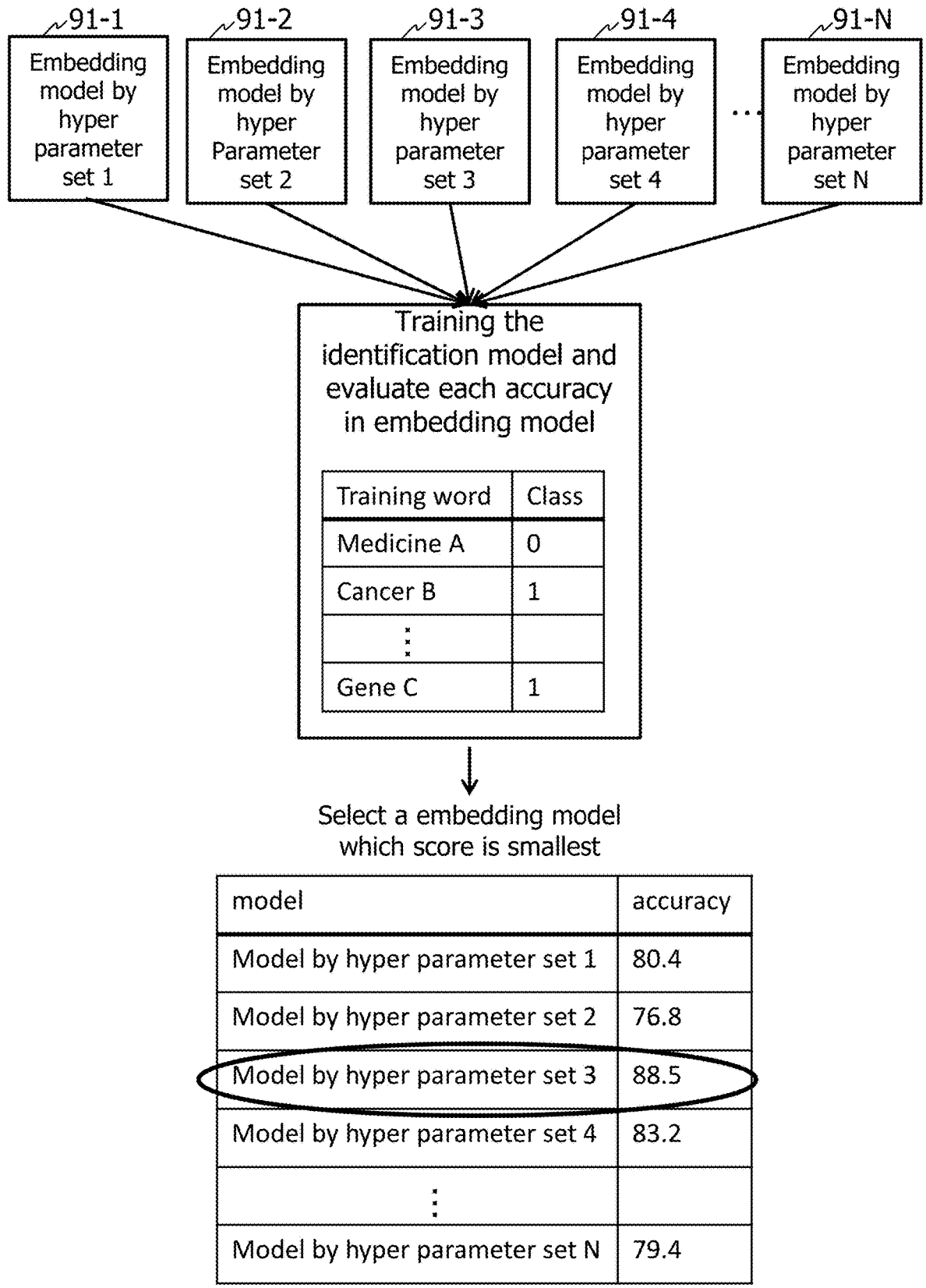
FIG. 9 is a diagram illustrating an example of processing for calculating the score performed in step S704 illustrated in FIG. 7 according to the embodiment of the present invention.

FIG. 9 is a diagram illustrating an example of the process of calculating the score in step S704 illustrated in FIG. 7. The optimization section 310 does not use mutually each word vector generated by the model learnt in step S703. The optimization section 310 inputs the word vector as a characteristic amount and calculates the score by using a result of identifying the characteristic amount as a class prepared in advance.

In the class prepared in advance, according to the present embodiment, two classes of the type 1 diabetes and the type 2 diabetes, two classes of a diabetic patient and an able-bodied person, and the like are considered. The optimization section 310 generates an identification unit using the high-dimensional vector generated by using the model by each hyper parameter.

Then, the optimization section 310 inputs the words to N kinds of models 91-1 to 91-N generated by N kinds of hyper parameters and generates the high-dimensional vector. Further, the optimization section 310 causes the generated high-dimensional vector to be identified to two classes and handles an identification accuracy of each identification unit as the score. Data used for an identification learning and calculation of the identification accuracy may be separated and prepared in advance for hyper parameter determination of the identification unit, for parameter determination, and for parameter evaluation. Further, the optimization section 310 may calculate the identification accuracy by using 10-fold cross validation etc. Further, a model having a highest identification accuracy may be selected from among the identification accuracies in N kinds of models.

Figure 10:
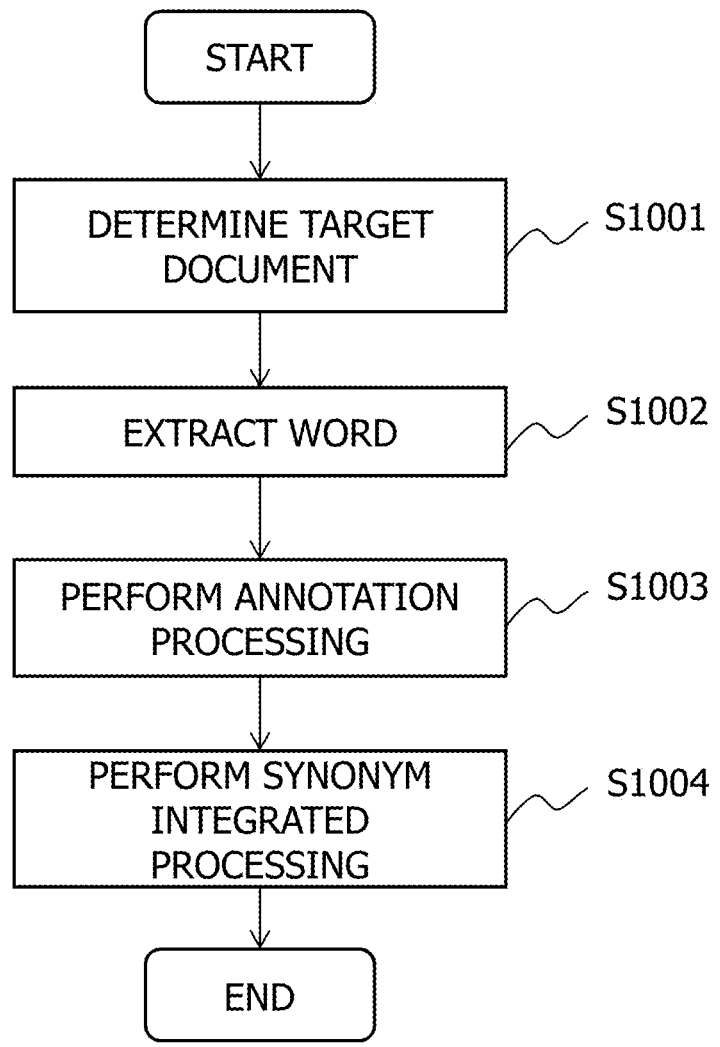
FIG. 10 is a flowchart illustrating an example of processing performed by a word selection section according to the embodiment of the present invention.

FIG. 10 is a flowchart illustrating an example of a selection method for the words stored in the reference data storage section 210 of the word selection section 420. The processes may be performed in step S702 illustrated in FIG. 7. Alternatively, the processes may be performed before executing the program 200 according to the present embodiment and programs may be stored in advance in the reference data storage section 210.

The word selection section 420 of the optimization section 310 first determines a target document to extract the word (step S1001). For example, regardless of the fact that the document set for learning in the natural language learning section 430 is the document set regarding finance, when the word used for the evaluation in the result evaluation section 440 is a word regarding the healthcare, there occurs a case where the word selection section 420 cannot convert the word into the high-dimensional vector because the word regarding the healthcare is not learnt.

That is, the word used for evaluation is required to be included in the document set used for learning. Therefore, the processing may be performed in each document set used for learning that can be selected by the hyper parameter generation section 410. Alternatively, apart from the document set used for learning as the fact that exception handling is performed on the word that is not learnt in the result evaluation section 440, the document set selected by a predetermined standard may be prepared and the processing may be performed.

Next, the word selection section 420 extracts a word from the determined document (step S1002). Continuously, the word selection section 420 performs annotation processing on the extracted word, excludes articles or verbs that are words unnecessary for analysis, and selects only words necessary for analysis (step S1003).

In the annotation processing, the word selection section 420 may use a dictionary defined by the user, a dictionary prepared in each technical term, or the like. Finally, the word selection section 420 performs synonym integrated processing, integrates the same words that are differently notated, and determines a word group used for analysis (step S1004). Then, the word selection section 420 may perform assortment of the words stored in each group of the reference data storage section 210 by using a dictionary based on a previously set knowledge base. Alternatively, the word selection section 420 may generate a group from a kind of the target document to be selected in step S1001.

Figure 11:
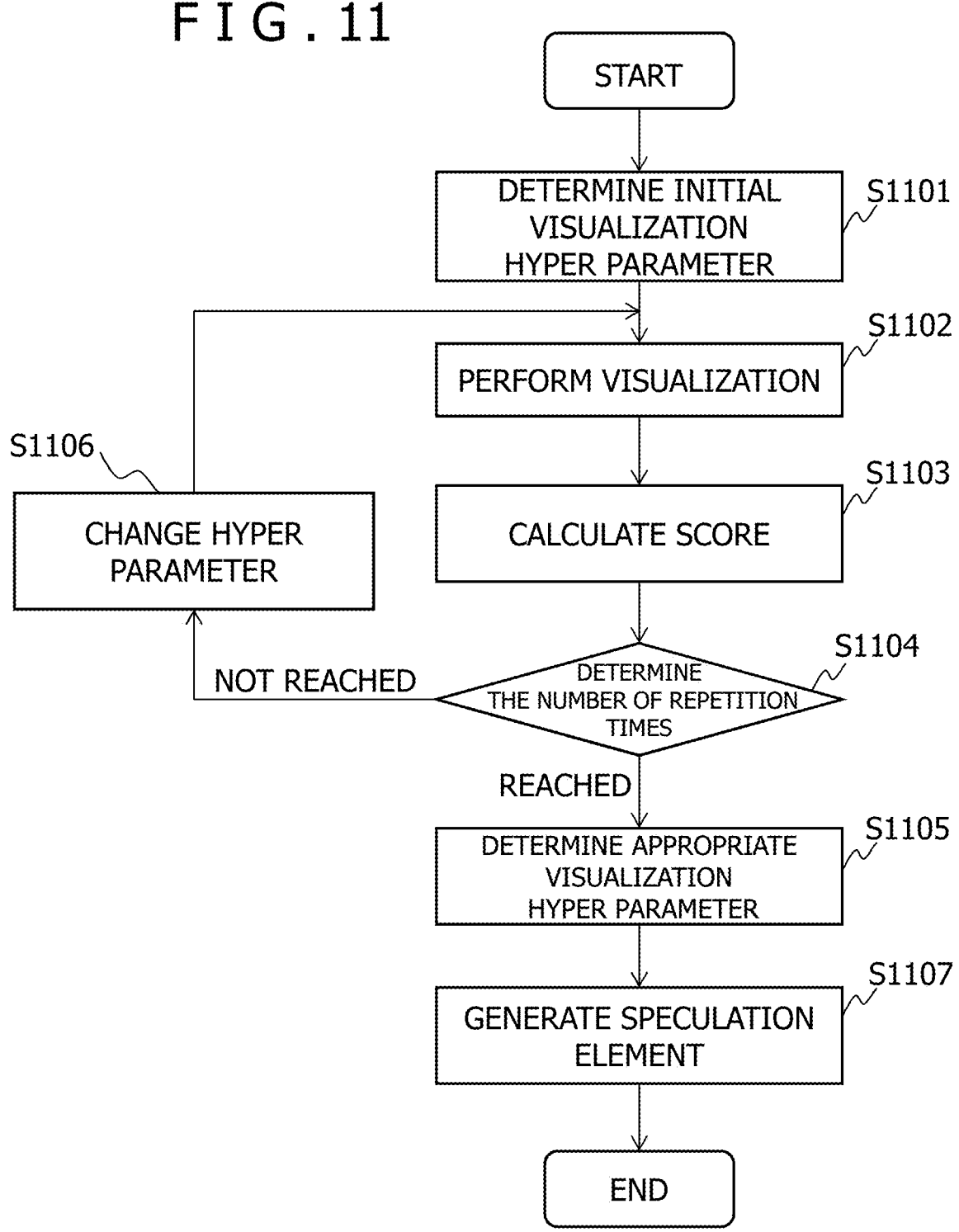
FIG. 11 is a flowchart illustrating an example of the processes performed by the high-dimensional visualization section according to the embodiment of the present invention.

FIG. 11 is a flowchart illustrating an example of the processes performed by the high-dimensional visualization section 320 of the optimization apparatus 100. The processes are performed in step S603 illustrated in FIG. 6.

The high-dimensional visualization section 320 of the optimization apparatus 100 optimally converts the model format into a format a person can easily interpret through visualization of the high-dimensional vector by using the group stored in the reference data storage section 210.

First, the high-dimensional visualization section 320 determines a range of the visualization hyper parameter in the visualization processing and the initial visualization hyper parameter (step S1101). The visualization hyper parameter in the visualization processing is a kind of algorithm for converting the high-dimension vector into the low-dimensional vector, such as t-SNE (t-distributed stochastic neighbor embedding) or main component analysis, an initial value or a learning rate in each algorithm, and the like.

Next, the high-dimensional visualization section 320 inputs the visualization hyper parameter determined in step S1101 and the high-dimensional vector generated by the optimization section 310 and converts them into the low-dimensional vector such as the two-dimensional vector or three-dimensional vector (step S1102). When the visualization hyper parameter is changed, even the generated low-dimensional vector changes.

Figure 12A:
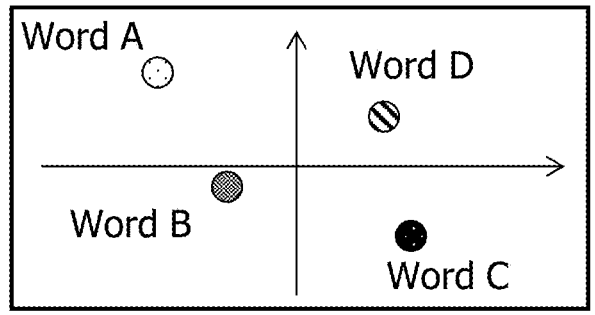
FIG. 12A is a diagram illustrating an example of visualization hyper parameter searching provided by the high-dimensional visualization section according to the embodiment of the present invention.
Figure 12B:
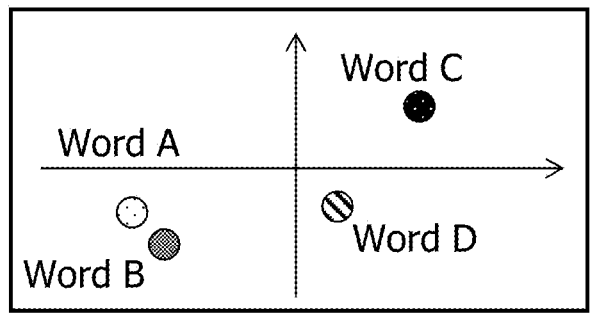
FIG. 12B is a diagram illustrating an example of the visualization hyper parameter searching provided by the high-dimensional visualization section according to the embodiment of the present invention.
Figure 12C:
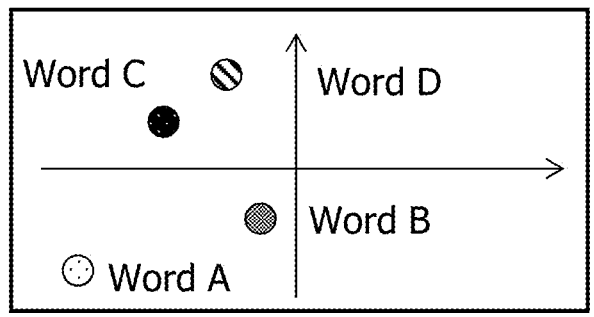
FIG. 12C is a diagram illustrating an example of the visualization hyper parameter searching provided by the high-dimensional visualization section according to the embodiment of the present invention.

FIGS. 12A to 12C are diagrams describing searching of the visualization hyper parameter in the high-dimensional visualization section 320. FIGS. 12A to 12C illustrate conditions in which the low-dimensional vectors of a word A, word B, word C, and word D are changed by the visualization hyper parameters (Parameter sets A to C in the figures).

For example, when there is no index such that it is preferable that the word A is close to the word B and the word A stays away from the word C, it is understood that it is difficult to determine that a result of which visualization hyper parameter is best among FIGS. 12A to 12C.

Then, the high-dimensional visualization section 320 calculates the score by using a word group in which a distance from a specified word or the high-dimensional vector is short or the group stored in the reference data storage section 210 among the low-dimensional vectors generated in step S1102 and the words selected by the word selection section 420 (step S1103).

Hereinafter, there will be described a case where the high-dimensional visualization section 320 uses words of the group stored in the reference data storage section 210. In the score, a vector distance between the words registered in each group is calculated as a Euclidean distance and is turned to the total sum of all the groups. The score calculation formula is represented by the following formula (2).

[Mathematical Formula 2]

$$\sum_{g=0}^{M} \sum_{i=0}^{N} |\text{map}(wordX_{g,i}) - \text{map}(wordY_{g,i})| \quad (2)$$

Here, M means a maximum number of a group number and N means a maximum number of a word pair number in each group. Further, a map (word $X_{g,i}$) and a map (word $Y_{g,i}$) mean the low-dimensional vectors in two words of the i-th word pair of a group number g.

When the score is small, words registered in group 1 of the reference data storage section 210 are arranged close to each other and even words registered in group 2 of the reference data storage section 210 are arranged close to each other. That is, it is conceivable that even if a word to which a meaning is close and that is similar even as a high-dimensional vector expression is converted into the low-dimensional vector, a relationship is not impaired and the similar words are converted so as to be agglomerated. In the present embodiment, the score is set to a Euclidean distance between the words and further a different index such as a vector angle between the words may be used.

Continuously, the high-dimensional visualization section 320 determines the number of repetition times (step S1104). Here, it is determined whether or not the number of repetition times reaches the predetermined number of times of performing the optimization. The number of times of performing the optimization may be determined in advance. Alternatively, the number of repetition times may be given as the dynamic number of times in which it is determined whether or not the score calculated in step S1103 is smaller than a predetermined threshold.

If the number of repetition times does not satisfy the conditions such as the number of times of performing the optimization, the high-dimensional visualization section 320 changes the visualization hyper parameter set in step S1101 and performs the processes from step S1102 to step S1104 again (step S1105).

Here, in the visualization hyper parameter, in a case where the number of times of performing the optimization is determined in advance, the number of patterns (the number of times) may be prepared in advance. Alternatively, pattern searching may be performed like the descent method etc. so that the score becomes smallest.

If the conditions such as the number of times of performing the optimization are satisfied, the visualization evaluation section 530 determines the visualization hyper parameter in which the score is smallest and generates the low-dimensional vector generated by the visualization hyper parameter among the processes from step S1102 to step S1105 (step S1106).

Here, the low-dimensional vector is retained in each trial of the optimization in which the visualization hyper parameter is changed. Further, the low-dimensional vector in which the score is smallest may be extracted in step S1106. Finally, the speculation element presentation section 540 generates the speculation element by using the optimum low-dimensional vector etc. (step S1107). Note that the speculation element is an element including a possibility of obtaining a new knowledge and, for example, when the document set as a processing target is a scientific paper, words regarding an investigation performed for several decades can be obtained. Through the process, the user of the optimization apparatus 100 can speculate on a trend of the investigation in a field of the scientific papers, frontiers, or the like. In addition, the speculation element presentation section 540 may output, as the speculation element, a cluster of words as illustrated in FIGS. 12A to 12C.

Through the process, the high-dimensional visualization section 320 converts the high-dimensional vector generated by the model (learning model) determined in step S602 illustrated in FIG. 6 into the low-dimensional vector to thereby determine the visualization hyper parameter.

FIG. 13 is a flowchart illustrating an example of the processes performed by the speculation element presentation section 540. The processes are performed in step S1107 illustrated in FIG. 11.

First, the speculation element presentation section 540 determines data used for the speculation element (step S1301). As the data used for the speculation element, the low-dimensional vector determined by the visualization evaluation section 530 or the high-dimensional vector determined by the result evaluation section 440 is specified. Note, however, that as the data used for the speculation element, the low-dimensional vector determined by the visualization evaluation section 530 and the high-dimensional vector determined by the result evaluation section 440 may be specified.

Further, the data used for the speculation element may be only a specified word among the above vectors. Alternatively, the data used for the speculation element may be separated into a word for clustering to be described and a word as an analysis target for setting. Next, the speculation element presentation section 540 performs clustering processing by using the data determined in step S1301 (step S1302).

A heretofore known or well known technique such as a K-means method, a method based on a concept of Topological Data Analysis just has to be applied to a clustering method. Further, each cluster in the clustering method just has to be set in an arbitrary manner while the user of the optimization apparatus 100 refers to the data.

Continuously, the speculation element presentation section 540 calculates the center of gravity of each cluster (step S1303). Then, the speculation element presentation section 540 determines a specific range from the center of gravity of the cluster determined in step S1303 as an area of interest (step S1304). A distance from the center of gravity may be a radius of a circle or ellipse including the set cluster. Alternatively, the above distance just has to be set to a radius of a circle or ellipse including ten words in the vicinity.

Finally, the speculation element presentation section 540 analyzes words included in the area of interest (step S1305). The speculation element presentation section 540 extracts a title of a document or a sentence that appears in the document included in the document set (reference data) in which each word is used in the optimization section 310, extracts words that co-occur with each word in the document set, and extracts descriptions regarding each word in a dictionary that describes meanings of previously prepared technical terms, or the like, for ten words included in the area of interest using, as a center, the center of gravity of the cluster, for example. The speculation element presentation section 540 can output the extracted information as the speculation element.

Through the process, the speculation element presentation section 540 can convert the high-dimensional vector of each word generated by the acquired optimum model into the optimum low-dimensional space. Further, the speculation element presentation section 540 can present information (speculation element) that is helpful to an interpretation for each word.

Figure 14:
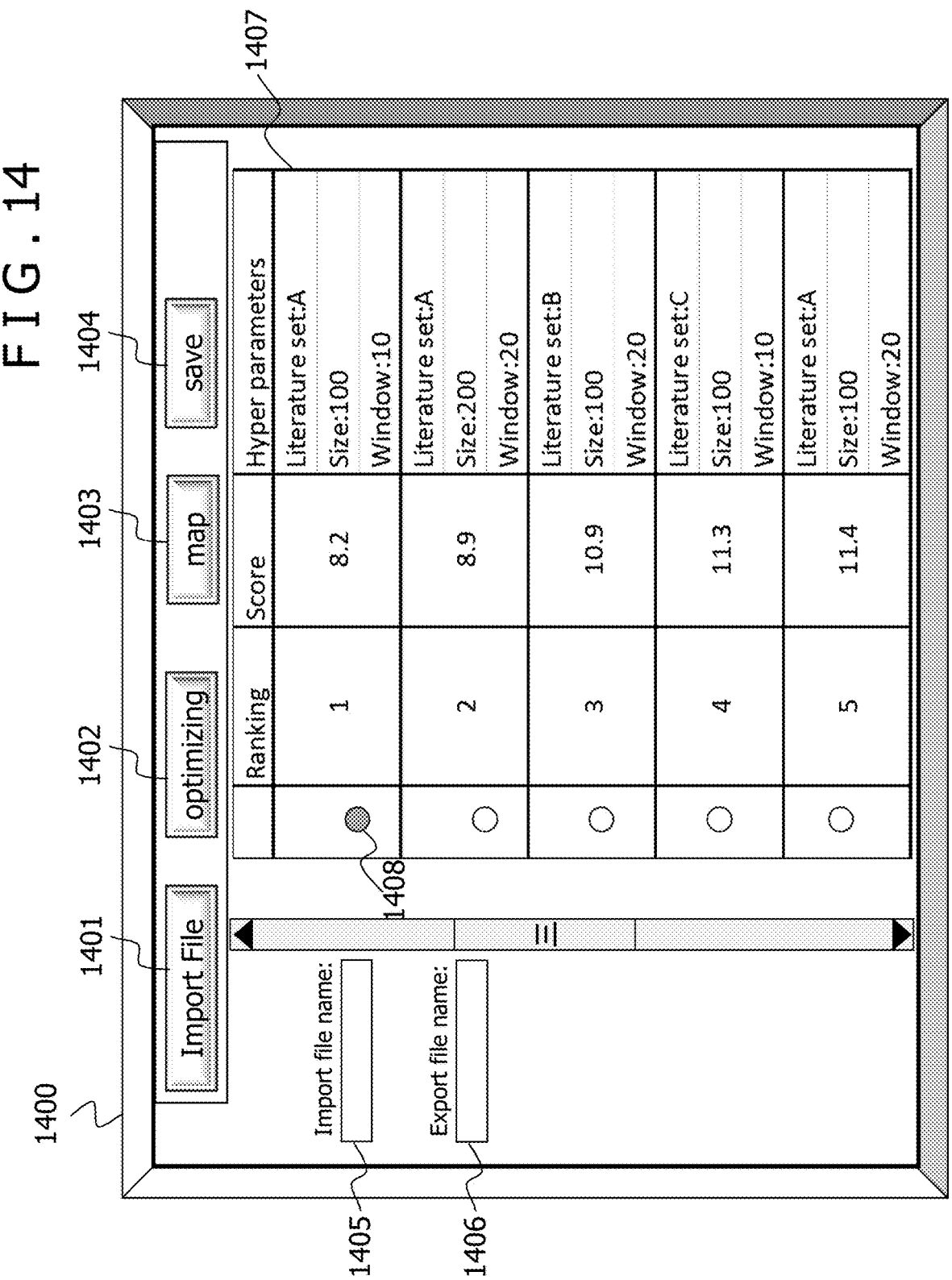
FIG. 14 is a diagram illustrating an example of a display screen of a hyper parameter according to the embodiment of the present invention.

FIG. 14 illustrates an example of a screen that is displayed on a display etc. that is the output apparatus 108 in the above processes. A display screen 1400 is output by executing the program 200 according to the present embodiment.

An Import file button 1401 arranged in an upper portion in the figure of the display screen 1400 is depressed and thereby a desired file is selected from a file selection screen (not illustrated in the figure). Thereby, the previously set hyper parameter used by the optimization section 310, the determined optimum model, the previously set visualization hyper parameter used by the high-dimensional visualization section 320, the determined low-dimensional vector, and the like can be read.

A name of the selected data is written in an Import file name column 1405. Then, an optimizing button 1402 is depressed and thereby optimization processing typified by the flowchart illustrated in FIG. 7 and executed by the optimization section 310 and the flowchart illustrated in FIG. 8 and executed by the high-dimensional visualization section 320, is performed.

A result displayed in a result display area 1407 illustrates an example in which the ranking, score, and hyper parameter are output as a table in the ascending order of the score calculated at the time of the optimization. An operator (or the user of the optimization apparatus 100) can select a desired hyper parameter set by using radio buttons 1408, check boxes, etc. concomitantly displayed on the table.

After the hyper parameter set is selected, when a Save button 1404 is depressed, a screen (not illustrated in the figure) in which a memory space desired to be stored can be specified is displayed. When the memory space (or the storage medium 109) is specified and an execution button is depressed, the selected hyper parameter set is stored in the specified memory space. The memory space (or the storage medium 109) as a storage destination is displayed in an Export file name column 1406 and the like.

After the optimization is performed by the high-dimensional visualization section 320, when a map button 1403 is depressed, graphs (FIGS. 12A to 12C etc.) in which the generated low-dimensional vector is drawn in a two-dimensional or three-dimensional space are displayed.

A word (not illustrated in the figure) in the graph is clicked and thereby the operator may perform the processes of the speculation element presentation section 540. A presentation of a title of a document or a sentence that appears in the document included in the document set in which each of the already analyzed words extracted by the speculation element presentation section 540 and used in the optimization section 310, a presentation of words that cooccur with each word in the document set, a presentation of descriptions regarding each word in a dictionary that describes meanings etc. of previously prepared technical terms, or the like is displayed in a table or the like.

In a case where an analysis result is desired to be stored, when the Save button 1404 is depressed, a screen in which the memory space desired to be stored can be specified is displayed. When the memory space is specified and the execution button is depressed, the analysis result is stored in the specified memory space. The memory space as the storage destination is written in the Export file name column 1406 or the like.

As described above, in hyper parameter searching for a model determination, the optimization apparatus 100 according to the present embodiment can generate a plurality of groups obtained by collecting words or sentences including a similar meaning or similar expression, store the plurality of groups in the reference data storage section 210, and further provide the hyper parameter in which the model can be generated so that a distance between the high-dimensional vectors in the group becomes smallest.

Through the process, the optimization apparatus 100 selects the hyper parameter in which the high-accuracy high-dimensional vector can be generated even in a term having high technicality for the document set as the analysis target. Thereby, the optimization apparatus 100 can obtain the optimum model in the standard according to the technicality of the document set for learning. Further, the optimization apparatus 100 can convert the high-dimensional vector of each word generated by the acquired optimum model into the optimum low-dimensional space and present information that is helpful to an interpretation of results for each word.

It should be noted that the present invention is not limited to the above-described embodiments and includes various modifications. For example, the above-described embodiments have provided details for the sake of better understanding of the present invention; they are not limited to those including all the configurations that have been described. A part of the configuration of each embodiment may be replaced with a configuration of another embodiment. Further, the configurations according to another embodiment may be added to the configurations according to a given embodiment. In each embodiment, other components may be added to, deleted from, or replace some components of the embodiment, and the addition, deletion, and the replacement may be applied alone or in combination.

The above-described configurations, functions, processing sections, processing means, etc., for all or apart of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, an SD card, or a DVD.

The drawings show control lines and information lines as considered necessary for descriptions but do not show all control lines or information lines in the products. It can be considered that most of all components are actually interconnected.

What is claimed is:

1. An optimization apparatus including a processor and a memory and performing learning of a document set by natural language processing, comprising:
    an optimization section configured to determine a hyper parameter satisfying a predetermined condition on a basis of previously set group data, generate a learning model by the determined hyper parameter, and acquire a high-dimensional vector from the learning model; and
    a high-dimensional visualization section configured to convert the high-dimensional vector of a word or document as an analysis target on the basis of the group data,
    wherein the high-dimensional visualization section generates a visualization hyper parameter, converts the high-dimensional vector into a low-dimensional vector of a two-dimensional vector or three-dimensional vector by using the generated visualization hyper parameter, performs an accuracy evaluation to the low-dimensional vector, and presents a visualization result having a highest accuracy, and wherein the high-dimensional visualization section presents a speculation element for performing a speculation to the visualization result or a result of the high-dimensional vector by using, as data used for the speculation element, an optimum low-dimensional vector.

2. The optimization apparatus according to claim 1, wherein
the optimization section generates the hyper parameter, acquires a word or document used for an evaluation of the learning model, generates the learning model by learning using the hyper parameter, and evaluates an accuracy by using the generated model and the word or document used for an evaluation of the model.

3. The optimization apparatus according to claim 2, wherein
the optimization section determines an evaluation of the accuracy by using the hyper parameter of the learning model in which a score is calculated on the basis of a distance between words and the score is smallest, as the hyper parameter satisfying the predetermined condition.

4. The optimization apparatus according to claim 1, wherein
the high-dimensional visualization section reads data used for the speculation element and outputs a result of performing clustering on a word included in the data as the speculation element.

5. An optimization method for a hyper parameter when a computer including a processor and a memory performs learning of a document set by natural language processing, comprising:
a first step of determining, by the computer, a hyper parameter satisfying a predetermined condition on a basis of previously set group data, generating a learning model by the determined hyper parameter, and acquiring a high-dimensional vector from the learning model; and a second step of converting, by the computer, the high-dimensional vector of a word or document as an analysis target on the basis of the group data,
wherein the second step includes generating a visualization hyper parameter, converting the high-dimensional vector into a low-dimensional vector of a two-dimensional vector or three-dimensional vector by using the generated visualization hyper parameter, performing an accuracy evaluation to the low-dimensional vector, and presenting a visualization result having a highest accuracy, and
wherein the second step includes a step of presenting a speculation element for performing a speculation to the visualization result or a result of the high-dimensional vector by using, as data used for the speculation element, an optimum low-dimensional vector.

6. The optimization method for a hyper parameter according to claim 5, wherein
the first step includes generating the hyper parameter, acquiring a word or document used for an evaluation of the learning model, generating the learning model by learning using the hyper parameter, and evaluating an accuracy by using the generated model and the word or document used for an evaluation of the model.

7. The optimization method for a hyper parameter according to claim 6, wherein
the first step includes determining an evaluation of the accuracy by using the hyper parameter of the learning model in which a score is calculated on the basis of a distance between words and the score is smallest, as the hyper parameter satisfying the predetermined condition.

8. The optimization method for a hyper parameter according to claim 5, wherein
the second step includes reading data used for the speculation element and outputting a result of performing clustering on a word included in the data as the speculation element.

* * * * *